United States Patent
Brockhaus et al.

(10) Patent No.: US 12,088,578 B2
(45) Date of Patent: Sep. 10, 2024

(54) CRYPTOGRAPHICALLY PROTECTED PROVISION OF A DIGITAL CERTIFICATE

(71) Applicant: Siemens Aktiengesellschaft, Munich (DE)

(72) Inventors: Hendrik Brockhaus, Unterbiberg (DE); Jens-Uwe Bußer, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 371 days.

(21) Appl. No.: 17/601,829

(22) PCT Filed: Mar. 25, 2020

(86) PCT No.: PCT/EP2020/058249
§ 371 (c)(1),
(2) Date: Oct. 6, 2021

(87) PCT Pub. No.: WO2020/212101
PCT Pub. Date: Oct. 22, 2020

(65) Prior Publication Data
US 2022/0191191 A1 Jun. 16, 2022

(30) Foreign Application Priority Data
Apr. 15, 2019 (EP) ..................... 19169200

(51) Int. Cl.
*H04L 9/40* (2022.01)
(52) U.S. Cl.
CPC ...... *H04L 63/0823* (2013.01); *H04L 63/0838* (2013.01); *H04L 63/0876* (2013.01)
(58) Field of Classification Search
CPC ................................................. H04L 63/0823
See application file for complete search history.

(56) References Cited

U.S. PATENT DOCUMENTS 7,827,399 B1 * 11/2010 Sheretov ............. H04L 63/0823
713/175
10,057,243 B1 8/2018 Kumar et al.
(Continued)

FOREIGN PATENT DOCUMENTS

CN 103780397 A 5/2014
CN 105635096 A 6/2016
(Continued)

OTHER PUBLICATIONS

PCT International Search Report mailed Jun. 24, 2020 corresponding to PCT International Application No. PCT/EP2020/058249 filed Mar. 25, 2020.

*Primary Examiner* — Ponnoreay Pich
(74) *Attorney, Agent, or Firm* — Schmeiser, Olsen & Watts LLP

(57) ABSTRACT

Provided is a method for the cryptographically protected provision of a digital certificate for a device, including the following steps: generating a one-time security ID according to a provided secret and at least one item of device-specific information; in a configuration device, transmitting the one-time security ID to the device; and in the device, generating an item of security information according to the one-time security ID; requesting a certificate by a request message, which contains an item of device-specific information and which is cryptographically protected by the security information, from an issuing authority; and at the issuing authority, checking the security information by the device-specific ID and the secret provided to the issuing authority; and transmitting a certificate to the device in the event of a positive check result.

14 Claims, 4 Drawing Sheets

(56) References Cited

U.S. PATENT DOCUMENTS

Figure 1:
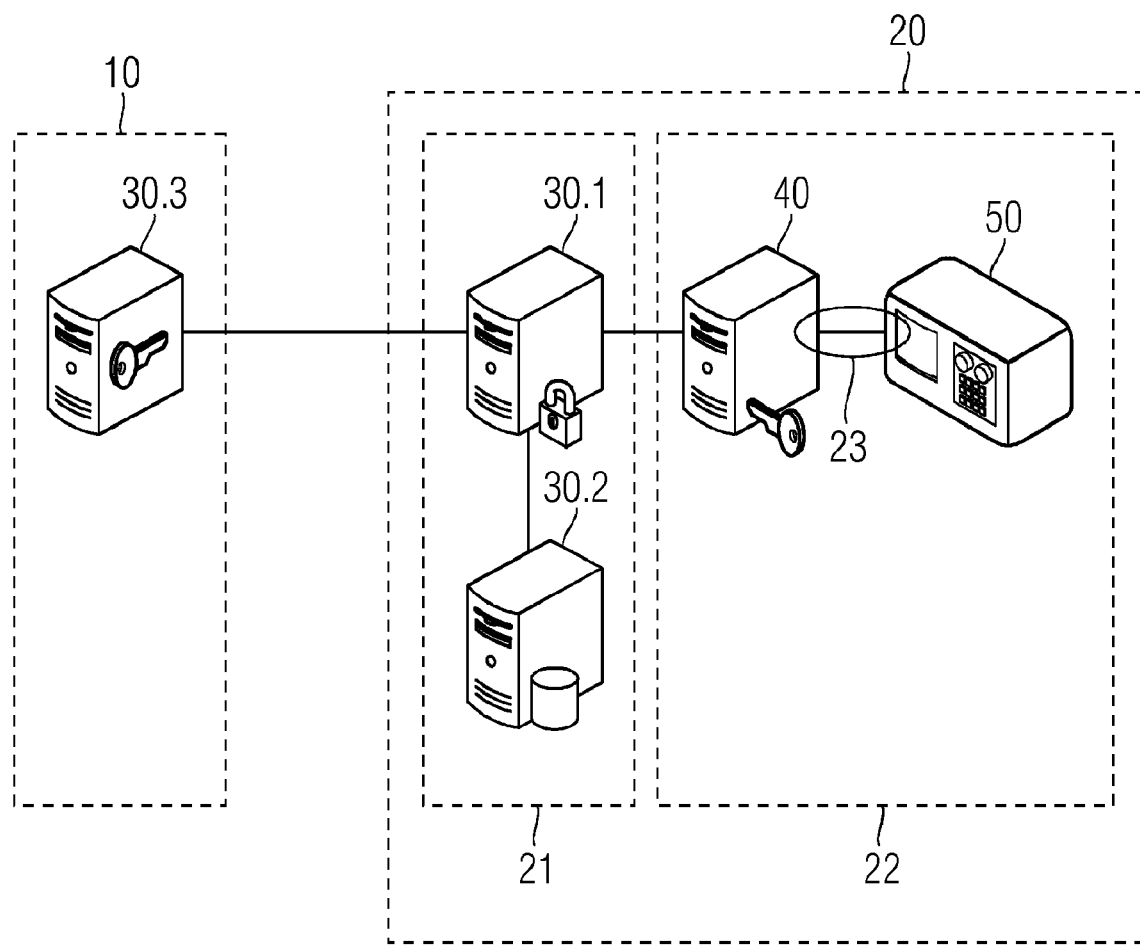

| | | | |
|---|---|---|---|
| 10,484,359 B2* | 11/2019 | Ramatchandirane | ......................... H04L 9/3263 |
| 2014/0245409 A1* | 8/2014 | Falk | ................... H04L 63/0823 726/6 |
| 2015/0113267 A1 | 4/2015 | Busser | |
| 2015/0229475 A1 | 8/2015 | Benoit et al. | |
| 2016/0057134 A1* | 2/2016 | Falk | ..................... G06F 21/335 726/6 |
| 2018/0211025 A1 | 7/2018 | Brockhaus et al. | |
| 2022/0191191 A1* | 6/2022 | Brockhaus | .......... H04L 63/0823 |

FOREIGN PATENT DOCUMENTS

| | | |
|---|---|---|
| CN | 108809907 A | 11/2018 |
| DE | 102015214696 A1 | 2/2017 |
| EP | 2863610 B1 | 4/2018 |
| WO | WO 2018202109 A1 | 11/2018 |

\* cited by examiner

CRYPTOGRAPHICALLY PROTECTED PROVISION OF A DIGITAL CERTIFICATE

CROSS-REFERENCE TO RELATED APPLICATIONS

This application claims priority to PCT Application No. PCT/EP2020/058249, having a filing date of Mar. 25, 2020, which claims priority to EP Application No. 19169200.3, having a filing date of Apr. 15, 2019, the entire contents both of which are hereby incorporated by reference.

FIELD OF TECHNOLOGY

The following relates to a method, to a security arrangement, to a configuration apparatus, to a device and to an issuing authority for the cryptographically protected requesting of a digital certificate for the device.

BACKGROUND

Digital certificates are used to inspect the authenticity and integrity of particular properties of devices using cryptographic methods. Devices are often already provided with a digital manufacturer certificate at production. This manufacturer certificate may then for example serve later on as proof of authenticity, and also be used to request further certificates and other security credentials.

If a certificate is not yet present on the device, for example a device that has just been newly produced or even an older device that was produced without a certificate, then one of the following two methods is usually used to create a first certificate, for example a manufacturer certificate: a key pair, consisting of a private and a public key, and an associated certificate are generated outside the device and installed on the device. This method is used especially when the device is not able to generate its own key pair or when the private key is intended to be stored with a central authority. One disadvantage in this case is that the private key also exists outside the device, has to be stored securely there and transported confidentially to the device and then possibly securely erased outside the device.

As an alternative, the key pair may also be generated directly in the device. The public key is then transported to a certificate issuing authority in order to generate a certificate. The private key remains in the device and is thus not able to be manipulated or disclosed during transport. However, it has to be ensured that only authorized devices are able to transmit their certificate requests to the issuing authority, and that requests from unauthorized devices are identified and declined.

U.S. Pat. No. 10,057,243 B1 discloses a method in which a gateway apparatus requests a digital certificate from a certification authority on behalf of a device without an IP address and processes and stores the obtained certificate for the device.

EP 2863610 B2 discloses for example a method for providing a plurality of digital certificates for a plurality of public keys of a device. The request for a respective digital certificate for a public key is in this case signed by a private key of another key pair of the device in order to link the requests to one another and to identify the change in an individual request.

In order to protect the confidentiality and for the purposes of authenticity and integrity of data communication, secure transmission protocols, such as for example a certificate management protocol CMP or EST, a transport layer security protocol TLS or an Internet Security protocol IPsec are usually used. These protocols however likewise use security credentials such as for example TLS certificates to check the authenticity of the communication partners and the integrity of the exchanged messages.

However, the device itself is not able to authenticate itself with an issuing authority when this involves the provision of a first certificate for the device, and therefore no credentials issued individually for the device for setting up a secure connection are yet present in the device.

If the transmission path from the device to the nearest issuing authority is short or if the device and the issuing authority are located in the same building, then this transmission distance may be protected against manipulation by unauthorized third parties through physical or organizational measures such as a Faraday cage or camera monitoring. This is however linked to high costs in terms of implementation and operation.

A group key present in the firmware of the device may also be used for authentication. However, this group key is identical for all devices that contain the same firmware. In order to be able to authenticate each device individually, it would be necessary to adapt firmware for each device, this likewise being linked to considerable extra expenditure.

SUMMARY

An aspect relates to disclosing an alternative method, linked to the smallest possible amount of additional effort, for securing the provision of certificate requests between a device and an issuing authority.

According to a first aspect, the embodiments of the invention relate to a method for the cryptographically protected provision of a digital certificate for a device, comprising the steps of
  generating a one-time security identifier on the basis of a provided secret and at least one device-specific indication in a configuration apparatus,
  transmitting the one-time security identifier to the device, and in the device
  generating security information on the basis of the one-time security identifier,
  requesting a certificate from an issuing authority by way of a request message that contains the device-specific indication and that is cryptographically protected by way of the security information, and
  in the issuing authority
  checking the request message on the basis of the security information by way of the device-specific identifier from the request message and the secret provided to the issuing authority, and
  transmitting the certificate to the device in the event of a positive check result.

A device-specific indication is in this case an indication specific to the device to which the digital certificate is intended to be provided and that uniquely identifies the device. This may for example be a serial number of the device or an address assigned to the device, for example a MAC address. The device-specific indication may in particular be any parameter contained in the certificate request. A configuration apparatus may be for example a configuration server that transmits configuration data, such as serial number, type, production date, media access control (MAC) address, to the device. The configuration apparatus may however also be an administration apparatus that is able to be connected to the device, or even an administrator itself that inputs the device-specific indication via a user interface on the device.

A one-time security identifier formed in this way is intended to be used only once and only for a specific certificate request of the device that has the device-specific indication. The method is thus independent of firmware contained in the device and in particular independent of an identifier present in the firmware for identifying the device. The same firmware may thereby be used for all devices. The method may furthermore also be used by old devices without a manufacturer certificate or other components without a certificate, for example software applications, to request a first digital certificate.

In an embodiment, the device-specific indication is ascertained from the request message in the issuing authority when the security information is checked, the one-time security identifier is ascertained on the basis of the device-specific indication and the secret, the security information is in turn ascertained therefrom on the basis of a one-time security identifier and the protection of the request message as formed by way of security information (PW) is checked.

The issuing authority is thus able to compare the security information with the security information contained in the request message using the device-specific indication contained in the request message. It is thus possible to check the authenticity of the device without a certificate, but only using the one-time security identifier.

In an embodiment, the one-time security identifier is generated by way of a predefined first function, wherein the same first function is known in the issuing authority and the configuration apparatus and the security information is generated in accordance with a predefined second function, wherein the same second function is known to the issuing authority and to the device.

The one-time security identifier may thus be generated independently of the device. The second function is known in the device, and so further information present in the device is able to be incorporated into the security information.

In an embodiment, the first and the second function are a cryptographic hash function or a combination of a plurality of hash functions.

It is thereby not possible to work out the one-time security identifier from ascertained security information. The second function may in particular also be implemented in spoofed form in order to make it more difficult for unauthorized third parties to read the function from the device and to calculate security information outside the device when the one-time security identifier is known.

The security information is used to protect the certificate request message, for example in the form of a secret parameter (password) for cryptographic message authentication code (HMAC)-based protection in a certificate management protocol CMP. A change to the request message is thus able to be identified effectively, and impermissible transmission of a valid certificate is able to be prevented.

In an embodiment, the one-time security identifier in a configuration apparatus is added to configuration data for the device and the configuration data are transmitted to the device.

No separate transmission of the one-time security identifier between the configuration apparatus and the device is thereby necessary. The one-time security identifier may be installed on the device as a further configuration feature in the course of the device configuration.

In an embodiment, the device-specific indication is at least one certificate element to be entered into the certificate or part of such an element.

On the one hand, this ensures that the device-specific indication is known in the issuing authority by virtue of the request message. On the other hand, no separate additional information element is necessary.

In an embodiment, the one-time security identifier is additionally generated on the basis of a unique continuous counter value, in particular of a generation time of the one-time security identifier and/or of a configuration-specific identifier.

This makes it possible to limit the validity of the one-time security identifier in terms of time and to make it possible to generate a new one-time security identifier at a later time for otherwise identical device parameters.

In an embodiment, the security information is additionally derived on the basis of at least one certificate request element contained in the request message.

This allows the issuing authority to easily derive a parameter required to ascertain the security information, that is to say the certificate request element, from the certificate request message.

In an embodiment, the security information is additionally derived on the basis of at least one group key arranged in the device.

This additionally makes it possible to additionally incorporate a group key contained in the firmware in order to check the device.

In an embodiment, the certificate request element that is used is valid in each case only for one request message.

The certificate request element may be for example the subject name in a request message that is newly allocated in each case for a request message. This thus ensures that the security information is also valid in each case only for one request message.

A second aspect of the embodiments of the invention relate to a security arrangement for the cryptographically protected provision of a digital certificate for a device, having a configuration apparatus that is designed to generate a one-time security identifier on the basis of a secret and at least one device-specific indication and to transmit the one-time security identifier to the device. The security arrangement furthermore has a device that is designed to generate security information on the basis of the one-time security identifier and to request the certificate from an issuing authority by way of a request message that contains the device-specific indication and that is cryptographically protected by way of the security information. The security arrangement furthermore has the issuing authority that is designed to check the request message (Req) by way of the security information as well as the device-specific indication and the secret provided to the issuing authority and to transmit a certificate to the device in the event of a positive check result.

Such a security arrangement allows the device to be authenticated by the issuing authority using the one-time security identifier.

A further aspect of the embodiments of invention relate to a configuration apparatus for the cryptographically protected provision of a digital certificate for a device, which is designed to generate a one-time security identifier on the basis of a secret and at least one device-specific indication and to transmit the one-time security identifier to the device and to perform the described method.

Such a configuration apparatus actively supports checking of the device authenticity with an issuing authority.

A further aspect of the invention relates to a device that is designed to generate security information on the basis of a one-time security identifier and to request the certificate from an issuing authority by way of a request message that contains the device-specific indication and that is cryptographically protected by way of the security information and to perform the described method.

A further aspect of the embodiments of the invention relate to an issuing authority for the cryptographically protected provision of a digital certificate for a device, which is designed to check a request message by way of the security information and the device-specific identifier and a secret and to generate a certificate in the event of a positive check result and to transmit it to the device.

A further aspect of the embodiments of the invention relate to a computer program product (non-transitory computer readable storage medium having instructions, which when executed by a processor, perform actions) comprising a computer-readable medium that is able to be loaded directly into a memory of a digital computer, comprising program code portions that are suitable for performing the steps of the described method.

Unless indicated otherwise in the following description, the terms "generate", "transmit", "check", "configure" and the like refer to operations and/or processes and/or processing steps that change and/or generate data and/or convert data into other data, wherein the data may in particular be represented or be present as physical variables, for example as electrical pulses. The expression "computer" should in particular be interpreted as broadly as possible in order in particular to cover all electronic devices having data processing properties. The expression "device" should in particular be understood to mean an electronic device having data processing properties. A device comprises one or more processors that are designed for example as main processors, as a microprocessor or as a microcontroller or else as digital signal processors. A "unit" or a "module" may be implemented in the form of hardware and/or else in the form of software. In the case of a design in the form of hardware, the unit comprises at least one processor. In the case of an implementation in the form of software, the respective unit may be designed as a computer program product, as a function, as a routine, as part of a program code or as an executable object that is executed by the device.

BRIEF DESCRIPTION

Figure 2:
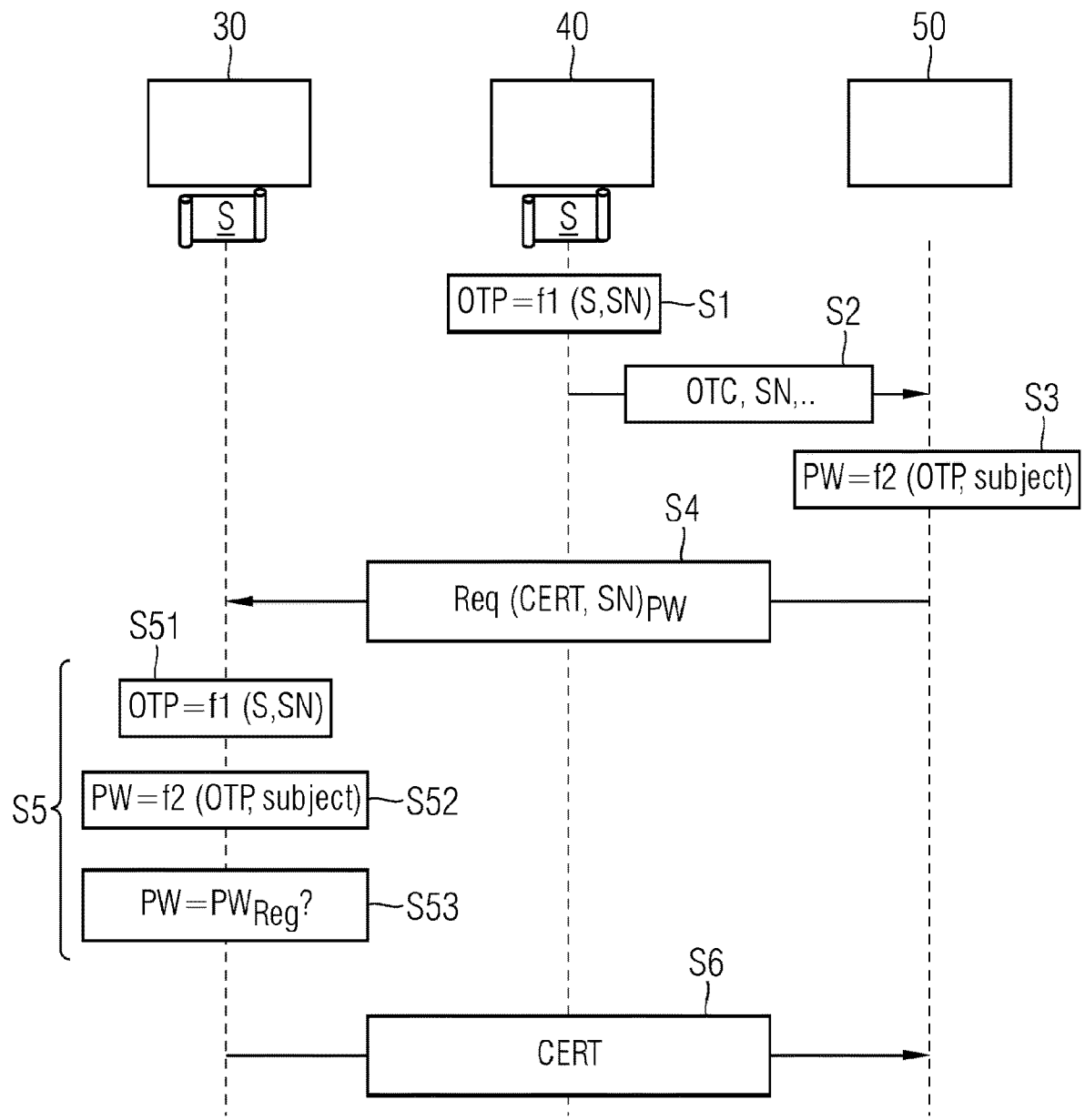
Figure 3:
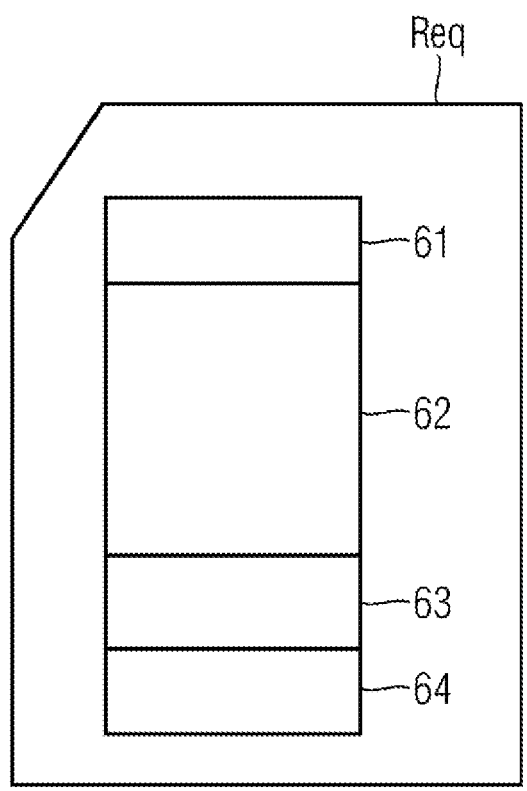
Figure 4:
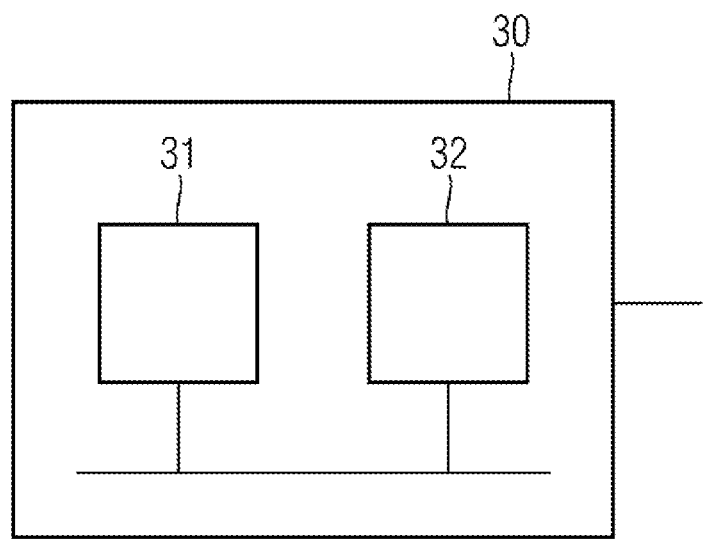
Figure 5:
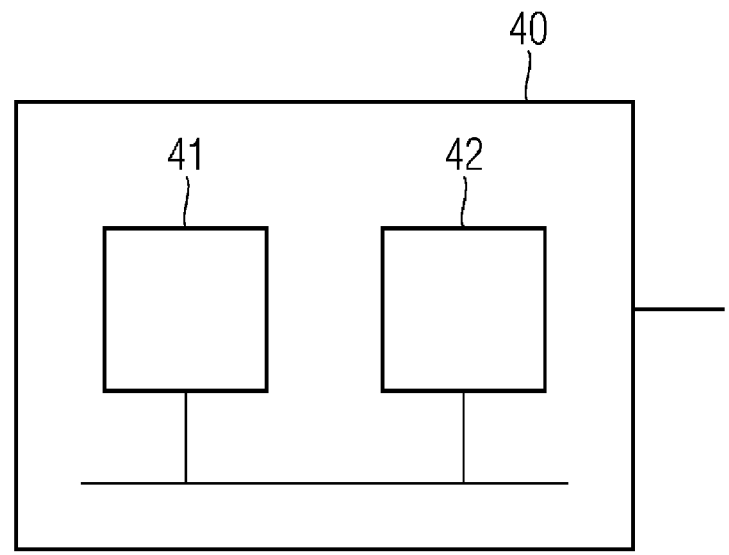
Figure 6:
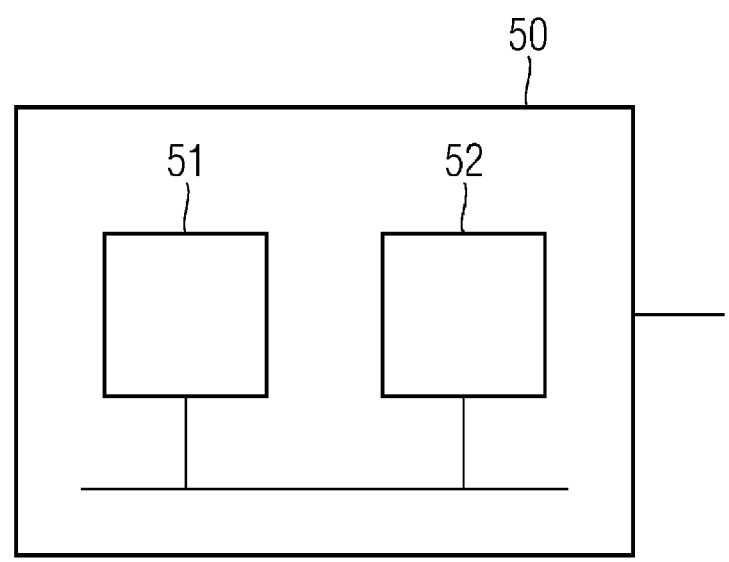

Some of the embodiments will be described in detail, with references to the following Figures, wherein like designations denote like members, wherein:

FIG. 1 schematically shows an exemplary embodiment of a security arrangement according to the invention containing respective exemplary embodiments of a configuration apparatus according to the invention, an issuing authority according to the embodiments of the invention and a device according to embodiments of the invention;

FIG. 2 shows an exemplary embodiment of the method according to embodiments of the invention in the form of a message flowchart; and FIG. 3 schematically shows a request message in accordance with the method according to embodiments of the invention;

FIG. 4 schematically shows an exemplary embodiment of a configuration apparatus according to the invention;

FIG. 5 schematically shows an exemplary embodiment of an issuing authority according to the invention; and FIG. 6 schematically shows an exemplary embodiment of a device according to the invention.

DETAILED DESCRIPTION

FIG. 1 shows an exemplary embodiment of a security arrangement, for example for providing a manufacturer certificate in a device 50, what is known as imprinting. Upon such initial allocation of a digital certificate for the device 50, a configuration apparatus 40 is for example connected directly to the device. The configuration apparatus 40 may for example be arranged in the production environment 22 of the device.

An issuing authority 30, in the illustrated example, comprises a registration authority 30.1 formed separately having a database 30.2 and a certification authority 30.3. The registration authority 30.1 is designed to check a request message, for example against device data in a database 30.2, and to establish a connection to the certification authority 30.3. The certification authority 30.3 and also the registration authority 30.1 and the database 30.2 connected thereto are usually located in a protected environment, for example in a trusted center 10 or in a protected area 21 within the production environment 20. In the production environment 20, the device 50, the configuration apparatus 40 and the registration authority 30.1 and database 30.2 are connected to a factory network. The issuing authority 30 creates the requested digital certificate or confirms the contained data through a signature with a private key of the issuing authority 30.

The individual components of the issuing authority 30, that is to say the certification authority 30.3, the database 30.2 and the registration authority 30.1, and the configuration apparatus 40, have digital certificates in order to authenticate themselves for the setup of a cryptographically protected data connection. Cryptographically protected connections may thus be set up between the components. However, the device 50 is not able to authenticate itself to the configuration apparatus 40, since the initial request for a certificate is the initial process for supplying the device 50 with a digital certificate, and therefore no certificates or other device-specific credentials for setting up a secure connection are yet present in the device 50.

In order to be able to authenticate authentication of the device 50 even upon this initial request for a digital certificate and to be able to cryptographically protect the communication connection 23 between the device 50 and the issuing authority 30, the configuration apparatus 40 is designed to generate a one-time security identifier on the basis of a provided secret S and at least one device-specific indication. The secret S is in this case likewise known to the issuing authority 30. The secret in the configuration apparatus 40 and the secret in the issuing authority 30 are identical.

The one-time security identifier may advantageously be transmitted from the configuration apparatus 40 to the device together with configuration data for the device 50, such as for example a serial number, a type designation, a production date or a further address of the device. The device 50 is in this case designed to generate security information on the basis of the one-time security identifier and to request the certificate from the issuing authority 30 by way of a request message that contains the device-specific indication and that is cryptographically protected by way of the security information. The issuing authority 30, 30.1 is designed to check the security information by way of the device-specific identifier and the provided secret and to transmit a certificate to the device 50 in the event of a positive check result.

The individual steps of the method performed by the configuration apparatus 40, the issuing authority 30 and the device 50 are described in more detail with reference to FIG. 2.

The secret S and a first function f1 are known to the issuing authority 30 and to the configuration apparatus 40. The second function f2 is known to the device 50 and to the issuing authority 30. The secret S and the first function f1 or the second function f2 may for example have been assigned to the issuing authority and the configuration apparatus, respectively to the issuing authority and the device, by the first certificate request.

In a first method step S1, the configuration apparatus 40 generates a one-time security identifier OTP on the basis of the secret S and a device-specific identifier SN, such as for example the serial number of the device 50, by way of a first function f1. One simple suitable first function f1 is for example a cryptographic hash or message authentication code function, which is for example present in the configuration apparatus 40 in obfuscated form. A configuration date of the device, which is then contained in the subsequent certificate of the device 50 as certificate element, is used as further input parameter for calculating the one-time security identifier. Further parameters may also be incorporated when ascertaining the one-time security identifier OTP, such as for example a batch number or a current date. The current date, which is for example the configuration date of the device 50, may be used to limit the validity in terms of time, and to make it possible to generate a new one-time security identifier OTP at a later time for otherwise identical device parameters.

In method step S2, the configuration apparatus 40 transmits the one-time security identifier OTP to the device 50. This may in particular take place together with the transmission of further configuration data to the device 50.

In method step S3, the device 50 uses a second function f2 to ascertain security information PW on the basis of the one-time security identifier OTP. The second function f2 may in this case for example be the identity, and so the security information PW is identical to the one-time security identifier OTP. Other expedient second functions f2 are for example an XOR link of the one-time security identifier OTP to a device-specific identifier SN, such as for example the serial number, or parameters that are contained in the subsequent request message Req to the issuing authority 30, such as for example to subject names. The security information PW may additionally be ascertained on the basis of a group key that is contained for example in firmware of the device 50, or of a hash value regarding information contained in firmware.

The security information PW is then used to cryptographically protect a certificate request to an issuing authority 30. To this end, in method step S4, a request message Req is generated by the device 50. The request message Req illustrated in FIG. 3, in addition to a conventional head part 61, comprises a message part 62. The security information PW may be contained in the request message Req as a digital protection function 63. The security information PW may however also be used as a key for calculating a protection function, for example a cryptographic message authentication code (HMAC), and be introduced into the request message. The message part 64 may contain further certificate parameters. If for example the certificate management protocol CMP with a digital signature is used as digital protection function 63, then the message part 64 may be used to transport further certificates that are required to verify this signature.

The issuing authority 30 receives the request message Req and, on the basis of the secret S known in the issuing authority 30 and the device-specific indication SN, for example the serial number of the device 50, using the first function f1, forms the one-time security identifier OTP itself, see method step S51. In step S52, the security information is ascertained using the second function f2, which is likewise known in the issuing authority 30, on the basis of the calculated one-time security identifier OTP. In this case, the same second function f2 and the same further optional input parameters into the second function f2 are used in the issuing authority 30 and in the device 50. The same security information PW may thus be ascertained in the issuing authority 30 and in the device 50. If the security information PW is in turn used as input parameters for further protection functions, then these functions also have to be known in the issuing authority 30 in the same way as in the device 50 in order to check the authenticity. Ultimately, if the security information PW thus ascertained in the issuing authority 30 matches the security function transmitted in the request message Req, this results in a positive check result and the issuing authority 30 transmits the requested certificate CERT, see S6.

The method described here may also be used analogously to provide first operative certificates for software-based components on a computer, or previously installed old devices without a manufacturer certificate. In such a case, the configuration apparatus 40 may be formed by an administration computer or even an administrator that inputs the one-time security identifier OTP on an administration interface of the device 50.

FIG. 4 shows an issuing authority 30 that comprises, as integral component, a certification authority 30.3 and a registration authority 30.2, not illustrated. The issuing authority 30 according to embodiments of the invention has an inspection unit 31 that is designed to check the received request message Req in accordance with the abovementioned method. The inspection unit 31 is for example connected, via a data bus, to an output unit 32 that transmits the requested certificate to the device in the event of a positive check result. The issuing authority 30 furthermore comprises a storage unit in which the secret S is stored and provided to the inspection unit upon request.

FIG. 5 shows a configuration apparatus 40 having a control unit 41 and a memory 42 that are for example connected to one another via a data bus. The memory 42 contains for example configuration data for a device 50 and a secret S. The control unit 41 is designed to ascertain the one-time security identifier OTP on the basis of the secret S and at least one device-specific indication SN and to transmit it to the device 50.

FIG. 6 shows a device 50 according to embodiments of the invention having a generation unit 51 and a request unit 52. The generation unit 51 is designed to generate the security information PW on the basis of the received one-time security identifier OTP and to pass it to the request unit 52. The request unit 52 in turn creates a request message Req for a digital certificate that comprises the at least one device-specific indication SN that is contained in the requested certificate as a certificate element. The certificate request message Req is supplemented for example with the security information PW or supplemented for example with a hash function regarding the request message Req that is implemented as a key with the security information PW. A hash function formed in this way may be used to check the integrity of the request message Req in the issuing authority 30. In this case, the check may lead to a positive result only when the device-specific indication SN in the request message Req also matches the device-specific identifier SN used in the configuration apparatus 40.

By virtue of the device-specific indication SN, the one-time security identifier OTP is able to be used just once, specifically for the corresponding device. If the same device-specific indication SN is also used to form the security information PW, then the one-time security identifier OTP may also be used only for a certificate request that contains this device-specific indication SN, for example the serial number of the device.

Using the method according to the embodiments of the invention, it is possible to use the same firmware version for all devices of a production batch or of a model series. Devices or software applications without a manufacturer certificate may retrospectively request and receive a certificate in a secure manner in the same way using such a method.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for the cryptographically protected provision of a digital certificate for a device, comprising:
   generating a one-time security identifier on the basis of a secret and at least one device-specific indication in a configuration apparatus,
   transmitting the one-time security identifier to the device, and
   in the device
      generating security information on the basis of the one-time security identifier,
      requesting the certificate from an issuing authority by way of a request message that contains the device-specific indication and that is cryptographically protected by way of the security information, and
   in the issuing authority
      checking the request message by way of the security information and the device-specific indication and the secret that is also known to the issuing authority, and
      transmitting the certificate to the device in the event of a positive check result.

2. The method as claimed in claim 1, wherein the issuing authority ascertains the device-specific indication from the request message during the check, ascertains the one-time security identifier on the basis of the device-specific indication and the secret, in turn ascertains the security information therefrom on the basis of the one-time security identifier, and compares the ascertained security information with the security information used to protect the request message.

3. The method as claimed in claim 1, wherein the one-time security identifier is generated by way of a predefined first function, wherein the same first function is known in the issuing authority and the configuration apparatus, and wherein the security information is generated in accordance with a predefined second function, wherein the same second function is known to the issuing authority and to the device.

4. The method as claimed in claim 2, wherein the first and the second function are a cryptographic hash function or a combination of a plurality of hash functions, and the second function is in particular implemented in spoofed form.

5. The method as claimed in claim 1, wherein the one-time security identifier in the configuration apparatus is added to configuration data for the device, and the configuration data are transmitted to the device.

6. The method as claimed in claim 1, wherein the device-specific indication) is at least one certificate element to be entered into the certificate.

7. The method as claimed in claim 1, wherein the one-time security identifier is additionally generated on the basis of a unique continuous counter value, in particular of a generation time of the one-time security identifier and/or of a configuration-specific identifier.

8. The method as claimed in claim 1, wherein the security information is additionally derived on the basis of at least one certificate request element contained in the request message.

9. The method as claimed in claim 1, wherein the security information is additionally derived on the basis of at least one group key arranged in the device.

10. The method as claimed in claim 8, wherein the certificate request element that is used is valid in each case only for one request message.

11. A configuration apparatus for the cryptographically protected provision of a digital certificate for a device, said configuration apparatus comprising a control unit and a memory, wherein the control unit which is configured to generate a one-time security identifier on the basis of a provided secret stored in the memory and at least one device-specific indication, and to transmit the one-time security identifier to the device, and to perform the method as claimed in claim 1.

12. A device, said device being hardware that includes one or more processors, said device configured to generate, using the one or more processors, security information on the basis of a one-time security identifier, and to request, using the one or more processors, a digital certificate from an issuing authority by way of the request message that contains a device-specific indication and that is cryptographically protected by way of the security information, and to perform the method as claimed in claim 1.

13. An issuing authority for the cryptographically protected provision of a digital certificate for a device, said issuing authority comprising one or more processors, said issuing authority configured to check, using the one or more processors, the request message by way of a security information and the device-specific indication and a provided secret, and to transmit, using the one or more processors, the certificate to the device in the event of a positive check result, and to perform the method as claimed in claim 1.

14. A computer program product, comprising a computer readable hardware storage device having computer readable program code stored therein, said program code executable by a processor of a computer system to implement a method comprising a computer-readable medium that is able to be loaded directly into a memory of a digital computer, comprising program code portions that are suitable for performing the steps of the method as claimed in claim 1.

* * * * *